United States Patent
Bläsing et al.

(10) Patent No.: US 6,653,620 B2
(45) Date of Patent: Nov. 25, 2003

(54) METHOD FOR EVALUATING A SIGNAL IN AN OPTOELECTRONIC POSITION MEASURING DEVICE

(75) Inventors: Frank Bläsing, Werl (DE); Christian Schirp, Bochum (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 10/241,073

(22) Filed: Sep. 11, 2002

(65) Prior Publication Data

US 2003/0029993 A1 Feb. 13, 2003

Related U.S. Application Data

(63) Continuation of application No. PCT/EP01/12394, filed on Oct. 26, 2001.

(30) Foreign Application Priority Data

Nov. 15, 2000 (DE) .......................................... 100 56 604

(51) Int. Cl.[7] ................................................. G01D 5/34
(52) U.S. Cl. ............................ 250/231.13; 250/237 G; 250/231.14; 341/11
(58) Field of Search ....................... 250/231.13, 231.14, 250/231.16, 231.17, 231.18, 237 G; 33/1 PT; 341/3, 9, 11, 13, 31; 356/616–618

(56) References Cited

U.S. PATENT DOCUMENTS

| | | | |
|---|---|---|---|
| 4,074,128 A | * | 2/1978 | Harris et al. ................. 250/205 |
| 4,900,924 A | * | 2/1990 | Masuda et al. .......... 250/227.17 |
| 5,051,579 A | * | 9/1991 | Tsukiji et al. ............ 250/231.16 |
| 5,332,895 A | | 7/1994 | Rieder et al. |
| 5,773,820 A | * | 6/1998 | Osajda et al. ............. 250/231.14 |

FOREIGN PATENT DOCUMENTS

| | | |
|---|---|---|
| DE | 32 34 330 A1 | 9/1982 |
| DE | 34 90 596 C2 | 10/1984 |
| DE | 37 36 704 C2 | 10/1987 |
| DE | 42 25 320 C1 | 7/1992 |
| DE | 196 38 912 A1 | 9/1996 |

* cited by examiner

Primary Examiner—Stephone B. Allen
(74) Attorney, Agent, or Firm—Brooks Kushman P.C.

(57) ABSTRACT

A method for evaluating a signal generated by a position measuring system having an encoder with a code track. The encoder is interposed between a light source and a light sensor and moves relative to the light source and the sensor such that the code track transmits light from the light source onto the sensor. The light sensor generates the signal as a function of the light received by transducers of the sensor. The method includes determining brightness of a code track signal generated by sensor transducers assigned to a code track of the encoder and determining brightness of a non-code track signal generated by sensor transducers assigned to a non-code track of the encoder. The sensor transducers assigned to the code track of the encoder are then determined as being exposed to the light source as a function of the relative brightness between the code and non-code track signals.

14 Claims, 2 Drawing Sheets

METHOD FOR EVALUATING A SIGNAL IN AN OPTOELECTRONIC POSITION MEASURING DEVICE

CROSS-REFERENCE TO RELATED APPLICATIONS

This is a continuation of International Application PCT/EP01/12394, published in German, with an international filing date of Oct. 26, 2001.

BACKGROUND OF THE INVENTION

1. Field of the Invention

The invention concerns a process for evaluating the signal of an optoelectronic position or angular position measuring device with an encoder disk that can move relative to a transceiver comprising a light source and a sensor array having a number of optoelectronic transducers and that has at least one digital code track, with this process including the assignment of certain sensor array transducers to the at least one code track. The invention also concerns a preferred use of such a process.

2. Background Art

Position and angular position measuring devices are frequently used for automatic positioning and measurement in machine tools and in coordinate measuring instruments. For example, rotation angle sensors are used in the area of motor vehicles to determine the absolute angular position of the steering wheel and therefore they are also called steering angle sensors. Such optoelectronic steering angle sensors essentially include a rotor and a stator. The rotor is an encoder disk coupled to the rotational motion of the steering wheel and the stator is a transceiver. The encoder disk includes a light source, for example an LED system, located on one side of the encoder disk. A receiving device, which is usually a line sensor with numerous adjacent transducers, is on the other side of the encoder disk. From time to time the coding used by the encoder disk is a digital code which includes several parallel code tracks and is built in the manner of a Gray code, for example.

A value indicative of the steering angle is needed in motor vehicles so that this value can be supplied, for example, to a vehicle movement dynamics control system. In addition to the mentioned steering angle values, such a vehicle movement dynamics control system receives other measurement data, such as the wheel speed or the rotation of the motor vehicle about its vertical axis. The absolute steering angle and the steering speed are needed so that these values, along with the other captured data, can be evaluated by the vehicle movement dynamics control system and converted to control actuators such as the brakes and/or the engine management system.

Previously known position and angular position measuring devices evaluate the signal amplitudes of the transducers assigned to each code track by comparing the signal amplitude with a specified signal threshold. If the signal threshold is exceeded, the signal amplitude of the transducers assigned to this code track is evaluated as being exposed by the coding of the code track. If the signal amplitude is smaller than the specified signal threshold, an evaluation is made that the coding of this code track is not causing exposure of the transducers assigned to this code track.

Assignment of certain transducers to a code track is used in the previously known process to compensate for play of the encoder disk in its movement relative to the transceiver. For this purpose, the coding has at least one reference track assigned to it. Because the distance from the code tracks to the reference track is the same over the length of the code tracks, it can be determined which code track is exposing which transducer(s) by determining the position of the reference track on the sensor array.

Although the previously known process can achieve sufficiently precise results when the conditions which have an influence on signal detection remain constant, such position and angular position measuring devices can provide incorrect measurement results if, for example, environmental influences should change the idealized measurement parameters specified during the design of the position or angular position measuring device. When such an angular position measuring device is used as a motor vehicle steering angle sensor exact angle detection should be ensured under the most diverse influences.

For example, such a measuring system can be affected by stray light, or by the encoder disk being covered with condensation, ice, dust, etc., and the signal threshold is often exceeded in the examples mentioned not only when there is an actual direct exposure by the coding of a code track, but also due to stray light exposing the transducer elements assigned to such a code track. In a corresponding manner, it is also possible for the signal threshold not to be exceeded despite being exposed by the coding of a code track, for example, when there is dust. In these cases the angle value read from a steering angle sensor is faulty. Accordingly, the subsequent evaluations and analyses based on this value are also faulty.

SUMMARY OF THE INVENTION

Therefore, starting from this prior art that has been discussed, the invention is based on the task of further developing a process of the type mentioned above in such a way that it is able to avoid as much as possible the disadvantages described above.

In accordance with the invention this task is solved by evaluating the signal amplitudes of the transducers assigned to a code track and a non-code track. The relative difference in brightness is determined between the code track signal (which is relatively brighter when there is an exposure) and a non-track signal (which is relatively darker). A determination is then made on the basis of the difference in brightness about whether or not the transducers assigned to the code track are exposed by the coding of the code track.

In contrast to the known prior art, the process according to the invention involves evaluating the signal amplitude assigned to the one code track not in comparison with a specified fixed absolute signal threshold, but rather by determining the relative difference in brightness between the code track signal (which is relatively brighter when there is an exposure) and a non-track signal (which is relatively darker compared with it). Thus, in principle, the evaluation is independent of a signal threshold that takes into account only the absolute signal amplitude. The evaluation of signal amplitudes is much more sensitive this way, so that the decision threshold can be established at a substantially lower level.

This method makes it possible to compensate for environmental influences by relative evaluation. If there should be a reduction, which might also possibly be only local, in the luminosity exposing the sensor array transducers—which would mean that the signal would no longer be recognized using the prior art, for example—there still remains a detectable contrast between a code track or code track section exposing certain of the sensor array transducers and the non-track sections not exposed by these code tracks, so that the desired evaluation can be carried out without limitations. The signals of a code track are then evaluated as a function of the difference in brightness that is found between the code track signal (which is relatively brighter when there is an exposure) and a non-track signal (which is relatively darker) by determining whether or not the transducers assigned to the at least one code track are exposed by the coding.

The difference in brightness between the signals of a code track and a non-code track can be determined, for example, by considering the difference in these signal amplitudes, with a specified difference in brightness serving as a signal threshold. However, the relative difference in brightness of the two signal amplitudes can also be determined by dividing one by the other, with a specified ratio then serving as a signal threshold.

A relatively darker non-code track can be provided by a dark track which remains the same over the possible amount of movement of the encoder disk and which may be located next to the digital coding. However, it is also possible if several parallel code tracks are used to use the intermediate spaces between the code tracks, which are present anyway, as so-called intermediate tracks, in order to evaluate the sensor array transducers assigned to these intermediate tracks as non-track signals.

However, under especially unfavorable, low-contrast measurement conditions it can happen that when two code tracks neighboring a non-code track are exposed to light the sensor array transducers provided for capturing the non-code track signal are exposed with about the same brightness. Consequently, when there is an exposure, the resulting contrast between the intermediate track signal and the code track signal is very small and under some circumstances too small to be able to conclude that there has been exposure of the transducers assigned to the two code tracks. In such cases an exact measurement result can still be achieved if a correspondingly darker signal is used as a non-track signal.

It is also possible in addition to set an absolute signal threshold at a relatively high level, so that it is possible to conclude that there has been an exposure of the transducers assigned to the one code track if either the relative difference in brightness between the amplitude of the code track signal and the amplitude of a non-track signal is correspondingly large or if the signal amplitude of the transducers assigned to a code track exceeds the absolute signal threshold.

To increase the relative difference in brightness, that is the contrast, the evaluation process can also include steps to adapt the evaluation of the signal amplitudes to changing parameters which have an influence on the evaluation of the amplitude. Such adaptation can be done by recording the amplitude of a reference signal, subsequently evaluating the amplitude of the reference signal, and then adapting at least one parameter that is relevant for evaluating the amplitude.

This expansion of the process compensates for changing measurement conditions by adapting at least one parameter that is relevant for evaluating the amplitude. This is done by capturing the amplitude of a reference signal in addition to the signal of the at least one code track. In principle, the reference signal can be provided by any coding of the encoder disk which exposes transducers of the sensor array that are specified through several code steps. It is expedient, when using such a reference signal, for the actual reference signal to include only those areas in which appropriate setting of the encoder disk ensures that the transducers assigned to this code track are actually exposed. However, in another embodiment, the reference signal can also be provided by one of the encoder disk's own tracks, with the reference track(s) that are especially suitable for this purpose being those which are usually also made to compensate for movements of the encoder disk transverse to the direction in which the coding extends.

In another process step the signal amplitude of the reference signal is evaluated and compared, possibly with an absolute value or with previously recorded and stored reference signal amplitudes. Next, at least one of the parameters that is relevant for evaluating the amplitude is adapted on the basis of the result of the evaluation of the reference signal's amplitude. For example, if the amplitude of the reference signal is less than its earlier amplitudes and if this is due, for example, to condensation on the encoder disk or to the deposit of dust on the encoder disk, this can be compensated for by increasing the exposure time or the number of measurement steps necessary for capturing a signal amplitude, which are parameters that are relevant for evaluating the signal amplitudes. It is also possible to increase the luminosity of the light source so that after this adaptation the reference signal's amplitude once again has the value that was originally set.

The sensitivity of adaptation can be handled in different ways. For example, the step of evaluating the reference signal's amplitude can include averaging over a certain number of measurement steps. This means that the system's adaptation is damped according to the principle of a moving average. When the process is handled in this way, the adaptation time is slower—as a function of the desired number of measurement steps—than it is in a system in which adaptation occurs at every measurement step. The parameter that is relevant for evaluating the signal is adapted as a function of the average that is calculated.

The evaluation of the reference signal's amplitude can also include comparison with a reference signal amplitude, e.g. one or more preceding ones, e.g. in order to be able to document the course of changes and possibly to be able to make an extrapolation concerning the size of future changes.

BRIEF DESCRIPTION OF THE DRAWINGS

The preferred embodiments of the present invention is described with reference to the following figures.

DETAILED DESCRIPTION OF THE PREFERRED EMBODIMENT(S)

Figure 1:
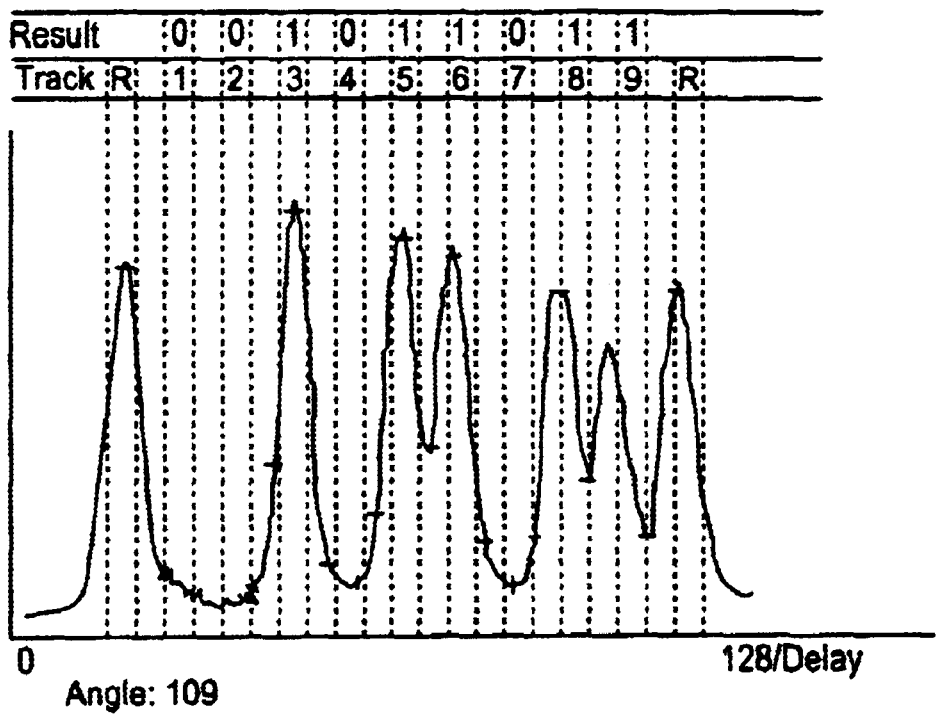
FIG. 1 illustrates a signal amplitude diagram read from a line sensor of an optoelectronic steering angle sensor under normal environmental conditions.
Figure 3:
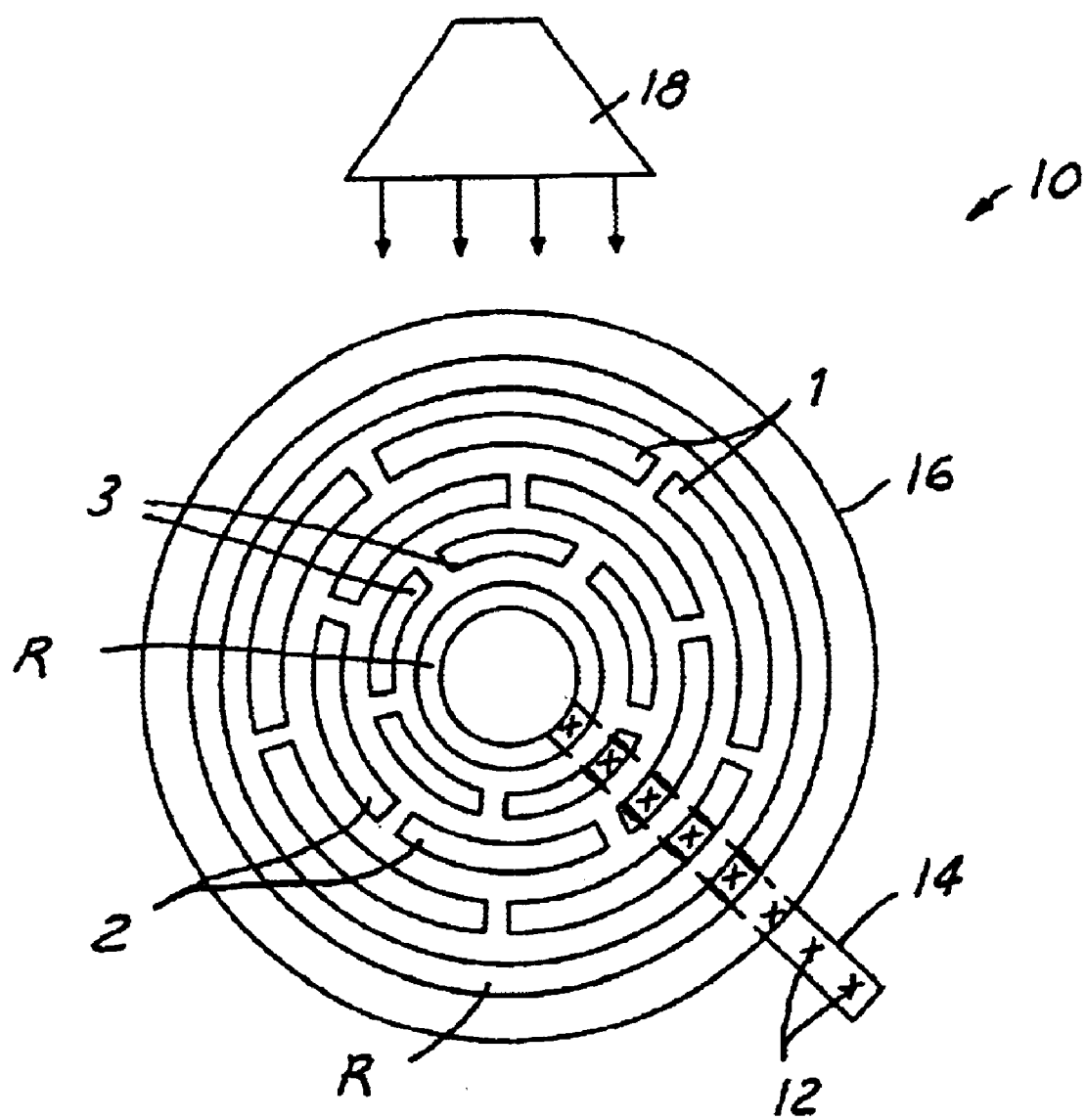
FIG. 3 illustrates a position measuring system in accordance with the present invention.

The X-axis of FIG. 1 shows the individual transducers 12 of a line sensor 14 in a steering angle sensor 10. The Y-axis plots the signal amplitude read by the individual transducers. The situation presented in FIG. 1 shows a readout result of the line sensor at a certain angle. The encoder disk 16 assigned to the steering angle sensor includes nine parallel code tracks (only three parallel code tracks marked with reference numerals "1", "2", and "3" are shown in FIG. 3), which have a so-called Gray code as their coding. The parallel code tracks are bordered on each side by a reference track through which the photosensitive surface of the line sensor is exposed by light from a light source 18 in each position of the encoder disk relative to the line sensor.

In FIG. 1, the reference tracks are marked with the letter "R" and the individual tracks are marked with the numbers "1" through "9". The intermediate track signals can be sampled through the transducers lying between the individual tracks. Each code track has a certain number of transducers of the sensor line assigned to it, e.g., three or five.

The assignment of certain transducers to certain code tracks or to so-called intermediate tracks is done by determining the transducers which are at a certain distance from the reference tracks. This is possible because the distance of the code tracks from the reference tracks is determined by the structure of the encoder disk and thus is known.

The reference tracks are used to compensate for movements which occur transverse to the direction of motion of the code tracks when the encoder disk moves. The distance of the code tracks from one another is known after the reference tracks R are detected, which allows certain transducers of the line sensor to be assigned to a certain code track. The transducers of the line sensor, which are located between the transducers assigned to the code tracks, are also evaluated and provide a reference value by making available a non-track signal or an intermediate track signal.

To evaluate the read-out result shown in FIG. 1, the relative difference in brightness between the signal amplitude of a code track and that of a neighboring non-code track—each of which is shown in FIG. 1 by the crosses in the curve, which represent the calculated signal amplitude from the transducers sampling this track—is determined, for example by forming a ratio. It can be seen in FIG. 1 that the relative difference in brightness between the signal amplitudes of tracks 1, 2, 4, and 7 relative to the signal amplitudes of the neighboring intermediate track signals is only very small. If ratios are formed of the signal amplitudes of code tracks 1, 2, 4, and 7 to the signal amplitudes of the neighboring intermediate tracks, and if these ratios are compared with a predetermined threshold, they do not exceed it.

Consequently, these tracks are considered unexposed by the coding of the encoder disk, as indicated in FIG. 1 by a "0" above each of these tracks in the "Result" line. The signal brightness determined by the line sensor transducers that are assigned to code tracks 3, 5, 6, 8, and 9 is several times higher than the signal brightness of the neighboring intermediate tracks. Consequently, these tracks are considered exposed which is indicated in FIG. 1 by a "1" above each of them.

Figure 2:
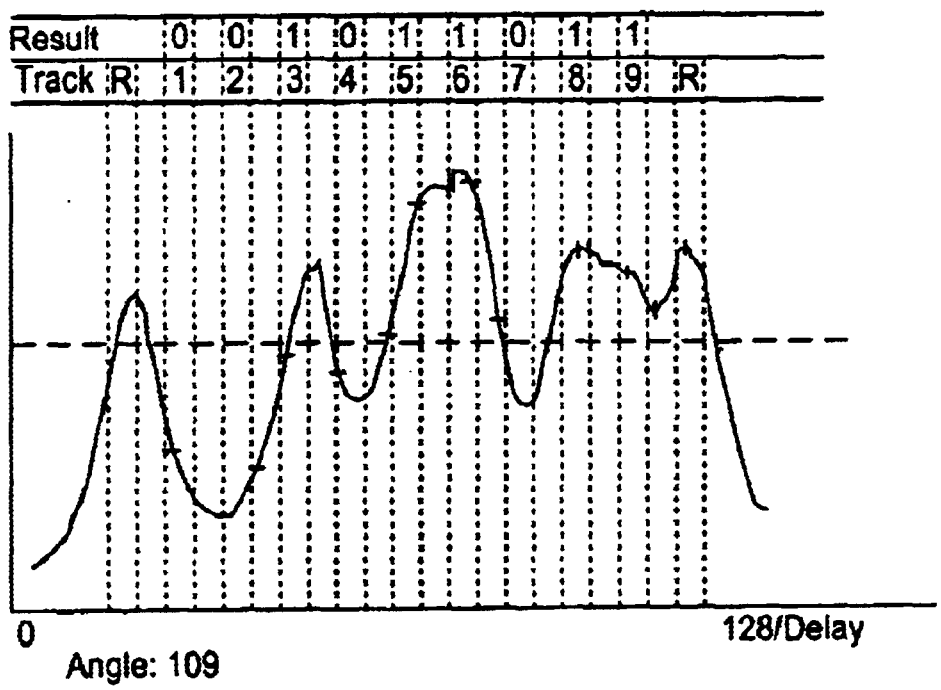
FIG. 2 illustrates a diagram corresponding to the diagram shown in FIG. 1 when the same angle setting is read out, however, with the encoder disk of the optoelectronic steering angle sensor being covered with ice.

FIG. 1 illustrates a steering angle sensor output for a steering angle sensor that is operating under normal environmental conditions. In contrast to the read-out result shown in FIG. 1, FIG. 2 illustrates a read-out result of the line sensor when the steering angle sensor's encoder disk is covered with ice as a consequence of unfavorable environmental conditions. The consequence is that the individual tracks are exposed to a considerable extent by stray light as well. This can be recognized especially by the high signal amplitudes of the non-track signals. To increase the contrast in amplitude between the signals assigned to a code track and those of the intermediate tracks, the exposure time is prolonged in response to the changed measuring conditions. In addition, to evaluate the code track signals an absolute threshold signal is set, e.g., between 70 and 80% of the reference track amplitude.

In this case, the line sensor transducers assigned to a code track are considered to be exposed by the coding of the encoder disk if either the relative differences in brightness between the signal of a code track and that of a neighboring intermediate track is sufficiently high, for example, as is the case with code track 3, or if their absolute signal amplitude exceeds the set threshold, even if their relative difference in brightness to neighboring intermediate tracks is small. This is the case with code tracks 5, 6, 8, and 9. This evaluation is based on the observation that under such measurement conditions when the transducers assigned to the code tracks are exposed by stray light the transducers assigned to the intermediate tracks located between the code tracks are also exposed.

The process according to the invention is especially suitable for evaluating the signal of optoelectronic position and angular position measuring devices which are exposed to alternating or changing environmental conditions. Therefore, a preferred use of such a process is to evaluate the signals of motor vehicle steering angle sensors.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for evaluating a position signal generated by a position measuring system having an encoder with at least one code track bordered by at least one non-code track, wherein the encoder is interposed between a light source and a light sensor and moves relative to the light source and the light sensor, wherein the at least one code track transmits light from the light source onto the light sensor when the encoder is in a given position relative to the light source, wherein the at least one non-code track prevents light from the light source onto the light sensor when the encoder is in any position relative to the light source, wherein the light sensor generates the position signal as a function of the transmitted light received by transducers of the light sensor, the method comprising the steps of:

(A) determining brightness of a code track signal contained in the position signal, the code track signal being generated by light sensor transducers assigned to a code track of the encoder;

(B) determining brightness of a non-code track signal contained in the position signal, the non-code track signal being generated by light sensor transducers assigned to a non-code track of the encoder;

(C) determining relative brightness between the code and non-code track signals; and (D) determining whether the light sensor transducers assigned to the code track of the encoder are exposed to the light source as a function of the relative brightness between the code and non-code track signals.

2. The method of claim 1 wherein:

steps (A) and (B) include determining amplitudes of the code and non-code track signals, wherein step (C) includes determining the difference in the amplitudes of the code and non-code track signals, wherein step (D) includes determining the light sensor transducers assigned to the code track of the encoder as being exposed to the light source if the difference of the code and non-code track signals is greater than a signal threshold.

3. The method of claim 2 further comprising:

adapting the signal threshold to a changing measurement parameter.

4. The method of claim 3 wherein:

adapting the signal threshold to a changing measurement parameter includes adapting the signal threshold based on the amplitude of a reference signal.

5. The method of claim 3 wherein:

the changing measurement parameter is indicative of a change in the luminosity of the light source.

6. The method of claim 1 wherein:

steps (A) and (B) include determining amplitudes of the code and non-code track signals, wherein step (C) includes determining the ratio of the amplitude of the code track signal over the amplitude of the non-code track signal, wherein step (D) includes determining the light sensor transducers assigned to the code track of the encoder as being exposed to the light source if the ratio of the amplitudes of the code and non-code track signals is greater than a signal threshold.

7. The method of claim 6 further comprising:

adapting the signal threshold to a changing measurement parameter.

8. The method of claim 7 wherein:

adapting the signal threshold to a changing measurement parameter includes adapting the signal threshold based on the amplitude of a reference signal.

9. The method of claim 8 wherein:

the changing measurement parameter is indicative of a change in the luminosity of the light source.

10. The method of claim 1 wherein:

step (D) includes determining the light sensor transducers assigned to the code track of the encoder as being exposed to the light source if the amplitude of the code track signal is greater than a specified absolute signal threshold.

11. The method of claim 10 further comprising:

adapting the signal threshold to a changing measurement parameter.

12. The method of claim 11 wherein:

adapting the signal threshold to a changing measurement parameter includes adapting the signal threshold based on the amplitude of a reference signal.

13. The method of claim 12 wherein:

the changing measurement parameter is indicative of a change in the luminosity of the light source.

14. The method of claim 1 wherein:

the position measuring system is an optoelectronic steering angle sensor for use in a motor vehicle.

* * * * *